(12) United States Patent
Kusumi

(10) Patent No.: US 7,643,534 B2
(45) Date of Patent: Jan. 5, 2010

(54) CLOCK SIGNAL CONTROLLING DEVICE

(75) Inventor: Tadaharu Kusumi, Osaka (JP)

(73) Assignee: Kyocera Mita Corporation (JP)

( * ) Notice: Subject to any disclaimer, the term of this patent is extended or adjusted under 35 U.S.C. 154(b) by 707 days.

(21) Appl. No.: 11/259,437

(22) Filed: Oct. 26, 2005

(65) Prior Publication Data

US 2007/0091982 A1 Apr. 26, 2007

(51) Int. Cl.
*H04B 1/00* (2006.01)
*H04L 7/00* (2006.01)
*G06F 1/12* (2006.01)

(52) U.S. Cl. .................. 375/130; 375/356; 713/600

(58) Field of Classification Search .............. 375/354, 375/362, 364, 130, 356; 358/408–411; 382/305–307, 382/317, 318; 713/600, 601
See application file for complete search history.

(56) References Cited

U.S. PATENT DOCUMENTS

| | | | | |
|---|---|---|---|---|
| 6,580,432 B1* | 6/2003 | Leung et al. | ................ | 345/558 |
| 2001/0019428 A1* | 9/2001 | Sugano et al. | ............. | 358/409 |
| 2001/0026252 A1* | 10/2001 | Shibata et al. | ................ | 345/60 |
| 2002/0158694 A1 | 10/2002 | Endo et al. | | |
| 2003/0063193 A1* | 4/2003 | Hongou | ..................... | 348/160 |
| 2004/0114669 A1 | 6/2004 | Takeuchi | | |

FOREIGN PATENT DOCUMENTS

| | | |
|---|---|---|
| JP | 2001-92311 | 4/2001 |
| JP | 2002-33858 | 1/2002 |
| JP | 2002-305446 | 10/2002 |
| JP | 2003150660 | 5/2003 |
| JP | 2004-21795 | 1/2004 |

* cited by examiner

*Primary Examiner*—Young T. Tse
(74) *Attorney, Agent, or Firm*—Gerald E. Hespos; Anthony J. Casella

(57) ABSTRACT

A clock signal generating section generates a clock signal of a predetermined frequency. A frequency spreading section spreads the frequency of the clock signal generated by the clock signal generating section based on a predetermined spread ratio. A controlling section sets the spread ratio of the frequency spreading section in accordance with a used state of a serial communication device and a parallel communication device. The clock signal controlling device having the above arrangement enables to suppress an electromagnetic wave emitted from an electronic device, and to keep a computation processing speed in the electronic device, and an operation speed of the electronic device from unduly lowering.

14 Claims, 6 Drawing Sheets

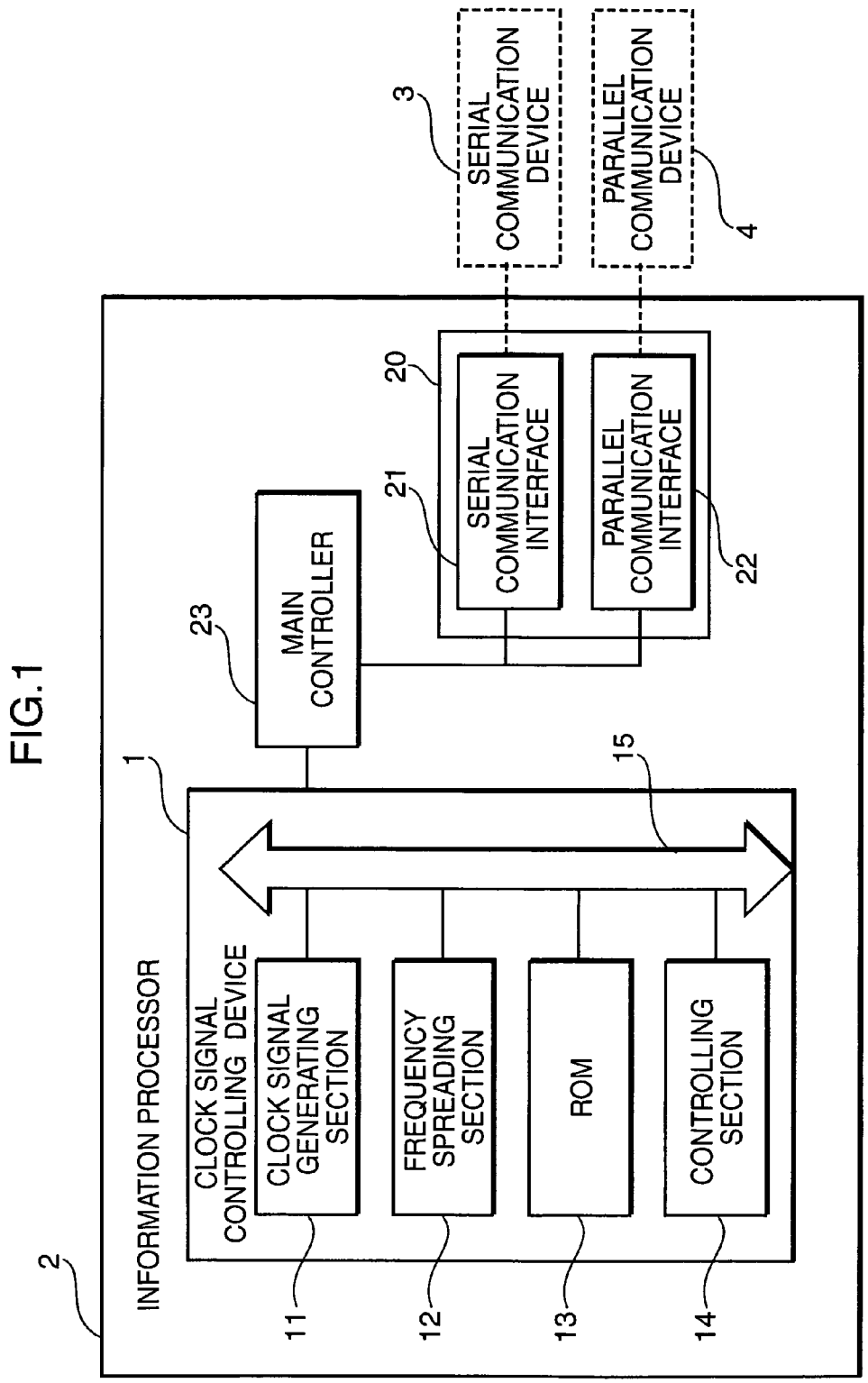

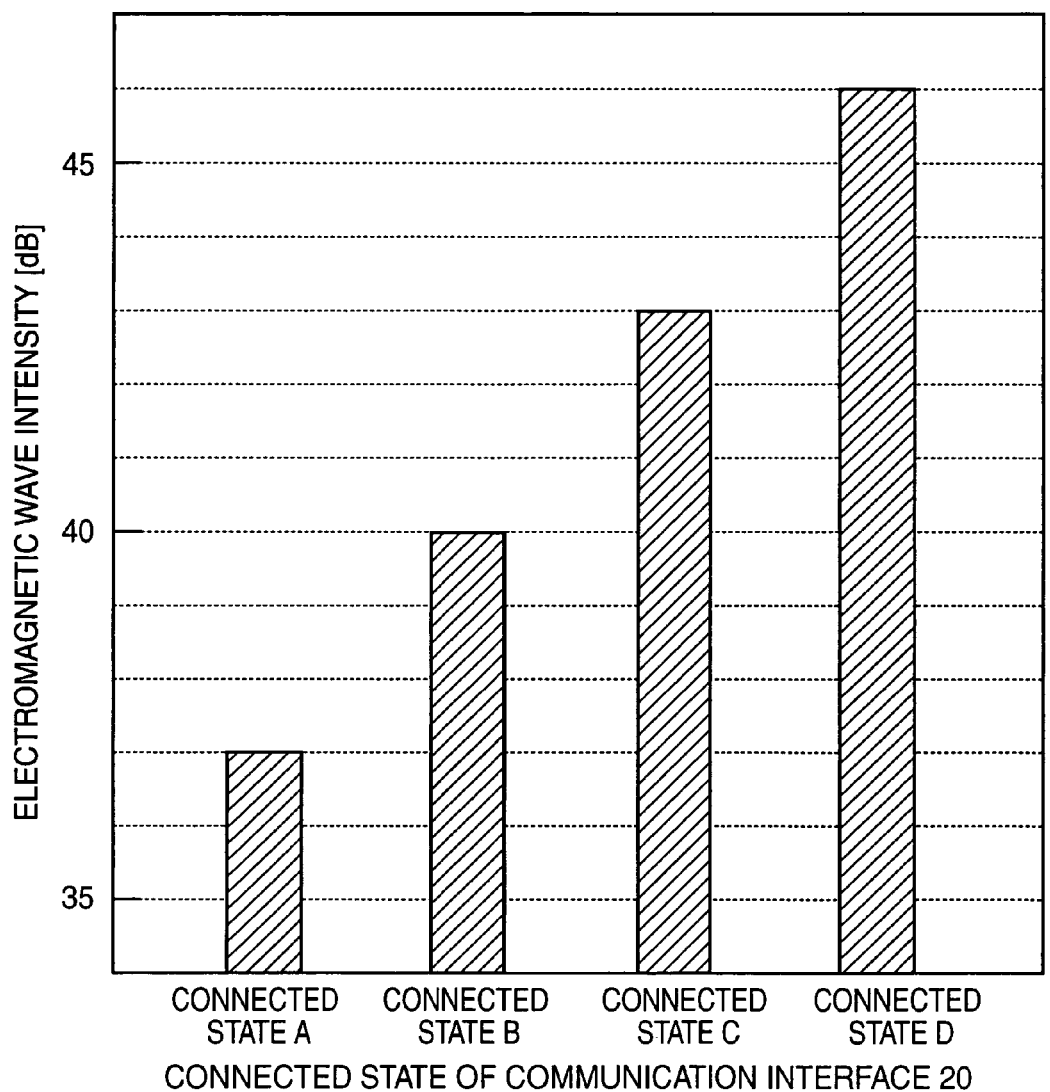

FIG.3

| CONNECTED STATE OF COMMUNICATION INTERFACE 20 | ELECTROMAGNETIC WAVE INTENSITY | SPREAD RATIO (%) |
|---|---|---|
| CONNECTED STATE A: CONNECTED NEITHER TO SERIAL COMMUNICATION DEVICE 3 NOR TO PARALLEL COMMUNICATION DEVICE 4 | 37 | 0 |
| CONNECTED STATE B: CONNECTED TO SERIAL COMMUNICATION DEVICE 3 | 40 | -1 |
| CONNECTED STATE C: CONNECTED TO PARALLEL COMMUNICATION DEVICE 4 | 43 | -2 |
| CONNECTED STATE D: CONNECTED BOTH TO SERIAL COMMUNICATION DEVICE 3 AND TO PARALLEL COMMUNICATION DEVICE 4 | 46 | -3 |

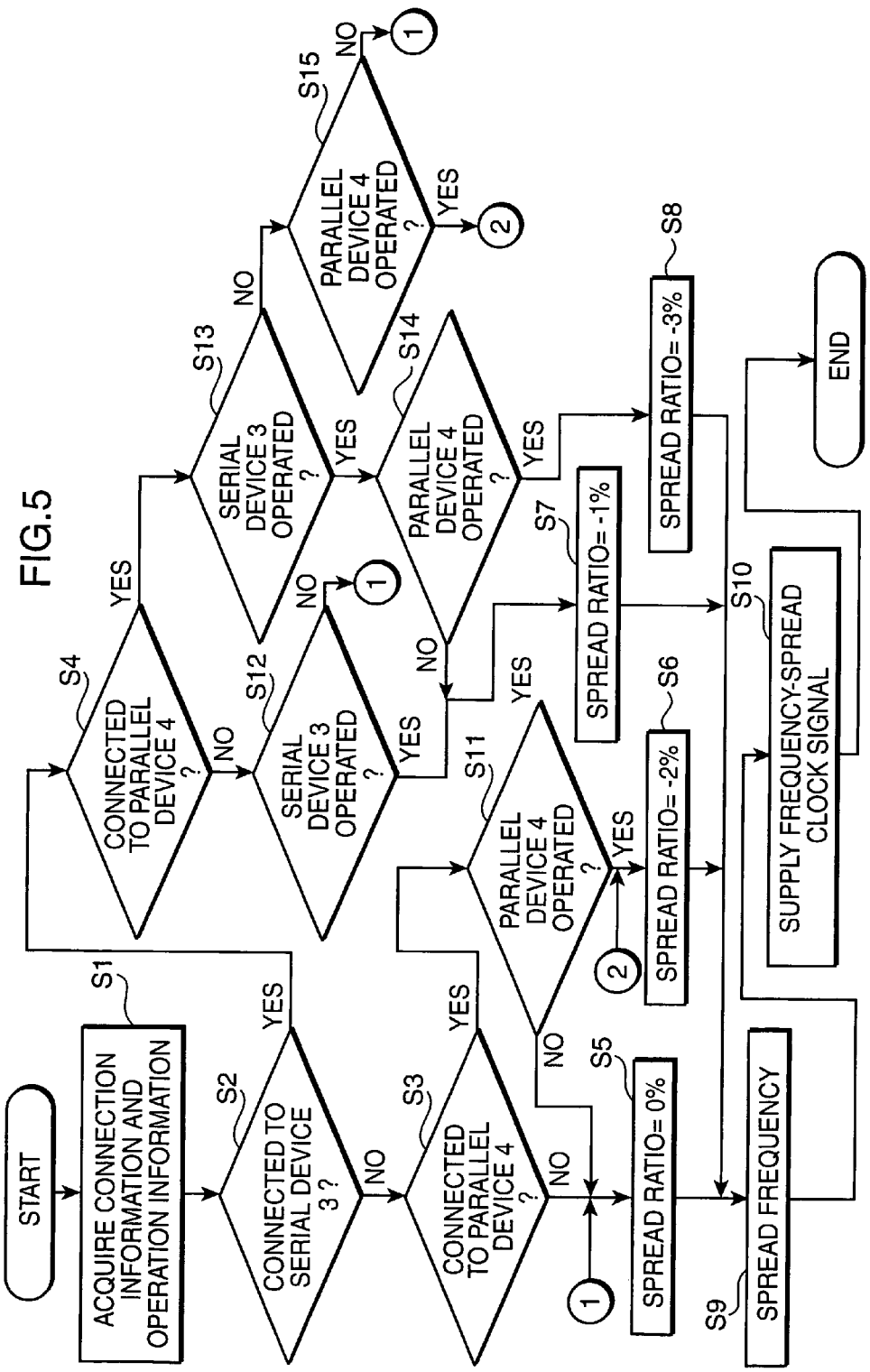

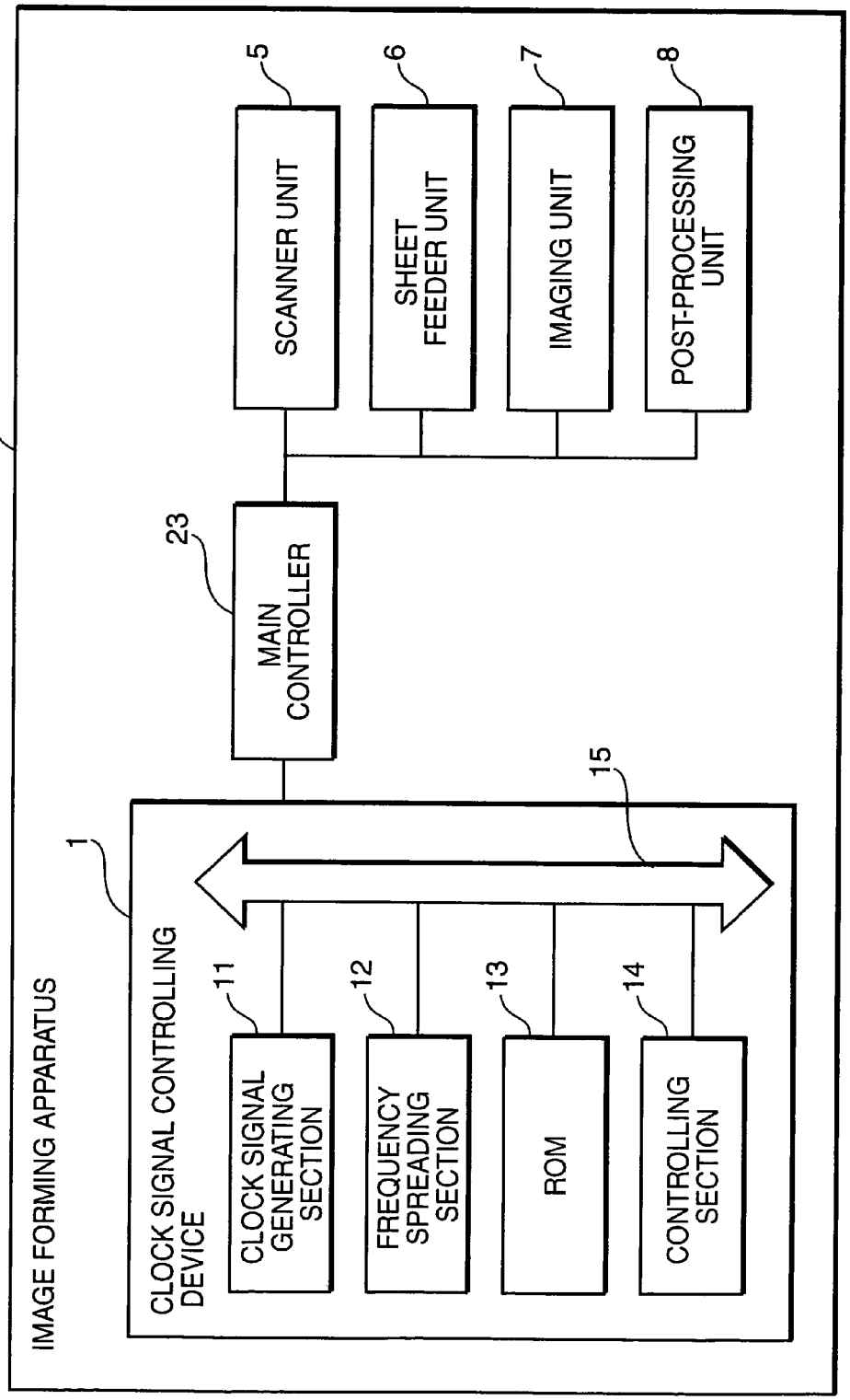

CLOCK SIGNAL CONTROLLING DEVICE

BACKGROUND OF THE INVENTION

1. Field of the Invention

The present invention relates to a technology for suppressing electromagnetic interference (EMI) resulting from an electromagnetic wave emitted from an electronic device, and particularly, to a technology for suppressing the electromagnetic interference by reducing the electromagnetic wave emitted from the electronic device by supplying a frequency-spread clock signal to a controller such as a CPU in the electronic device.

2. Description of the Related Art

Heretofore, the International Special Committee on Radio Interference (CISPR), the Voluntary Control Council for Interference by Information Technology Equipment (VCCI), and a like organization have regulated and set an allowable upper limit of an electromagnetic wave emitted from information processing apparatuses, telecommunication devices, electronic office appliances, and the like (hereinafter, called as "electronic devices") to suppress electromagnetic interference (EMI). In view of this, generally, the electronic devices are provided with an electromagnetic shield, ferrite beads, a choke coil, and the like to reduce an electromagnetic wave emitted therefrom.

Also, there is known a technique (see e.g. Japanese Unexamined Patent Publication No. 2002-33858), as one of the measures to suppress the EMI by reducing an electromagnetic wave emitted from the electronic devices. According to the technique, a spread spectrum clock generator (hereinafter, called as "SSCG") is used to supply a frequency-spread clock signal to a controller in the electronic device to keep the electromagnetic wave emitted from the electronic device from exceeding the predetermined allowable upper limit. The SSCG spreads the frequency of a clock signal generated by a clock signal generator such as a crystal oscillator having a crystal unit based on a predetermined constant spread ratio to supply the frequency-spread clock signal to the controller in the electronic device.

The clock signal is adapted to determine a computation processing speed of a CPU or a like device in the controller of the electronic device or the like. The computation processing speed may be lowered due to the clock signal whose frequency has been spread by the SSCG. A certain degree of lowering of the computation processing speed may be tolerated to suppress the EMI. However, it is desirable to minimize the lowering of the computation processing speed in the electronic device.

Since the spread ratio in the conventional SSCG is set to a constant value, as mentioned above, a clock signal whose frequency has been spread based on the constant spread ratio is constantly supplied to the electronic device irrespective of the intensity of an electromagnetic wave emitted from the electronic device. Therefore, even if the electromagnetic wave emitted from the electronic device is temporarily reduced depending on an operated state of the electronic device, an environment where the electronic device is installed, or other factor, the SSCG unduly spreads the frequency of the clock signal. In such a case, the computation processing speed of the CPU or the like in the controller of the electronic device which is operated in synchronism with the frequency-spread clock signal, the operation speed of the electronic device, or the like may be unduly lowered by the amount corresponding to the excessively spread of the frequency of the clock signal.

SUMMARY OF THE INVENTION

It is an object of the present invention to provide a clock signal controlling device that enables to suppress an electromagnetic wave emitted from an electronic device, and to keep a computation processing speed in the electronic device or an operation speed of the electronic device from unduly lowering.

An aspect of the invention is directed to a clock signal controlling device for controlling a clock signal to be supplied to one or more electronic devices. The clock signal controlling device comprises: a clock signal generating section which generates a clock signal of a predetermined frequency; a frequency spreading section which spreads the frequency of the clock signal generated by the clock signal generating section based on a predetermined spread ratio; and a spread ratio setting section which sets the spread ratio in accordance with a used state of the electronic device.

In the above arrangement, since the spread ratio is set in accordance with the used state of the electronic device, an electromagnetic wave emitted from the electronic device can be suppressed, and a computation processing speed in the electronic device or an operation speed of the electronic device can be kept from unduly lowering.

These and other objects, features and advantages of the present invention will become more apparent upon reading of the following detailed description along with the accompanying drawings.

BRIEF DESCRIPTION OF THE DRAWINGS

FIG. 1 is a schematic illustration of an information processor equipped with a clock signal controlling device embodying the invention.

FIG. 2 is a graph showing an example of a relation between the intensity of an electromagnetic wave emitted from the information processor, and a connected state of a communication interface in the information processor.

FIG. 3 is an illustration showing an example of a table concerning a spread ratio information stored in an ROM of the clock signal controlling device.

FIG. 5 is a flowchart showing another example of the operation procedure of the clock signal supplying process to be executed by the controlling section in the clock signal controlling device.

FIG. 6 is an illustration showing an example of an image forming apparatus to which the inventive clock signal controlling device is applied.

DETAILED DESCRIPTION OF THE PREFERRED EMBODIMENTS

Figure 4:
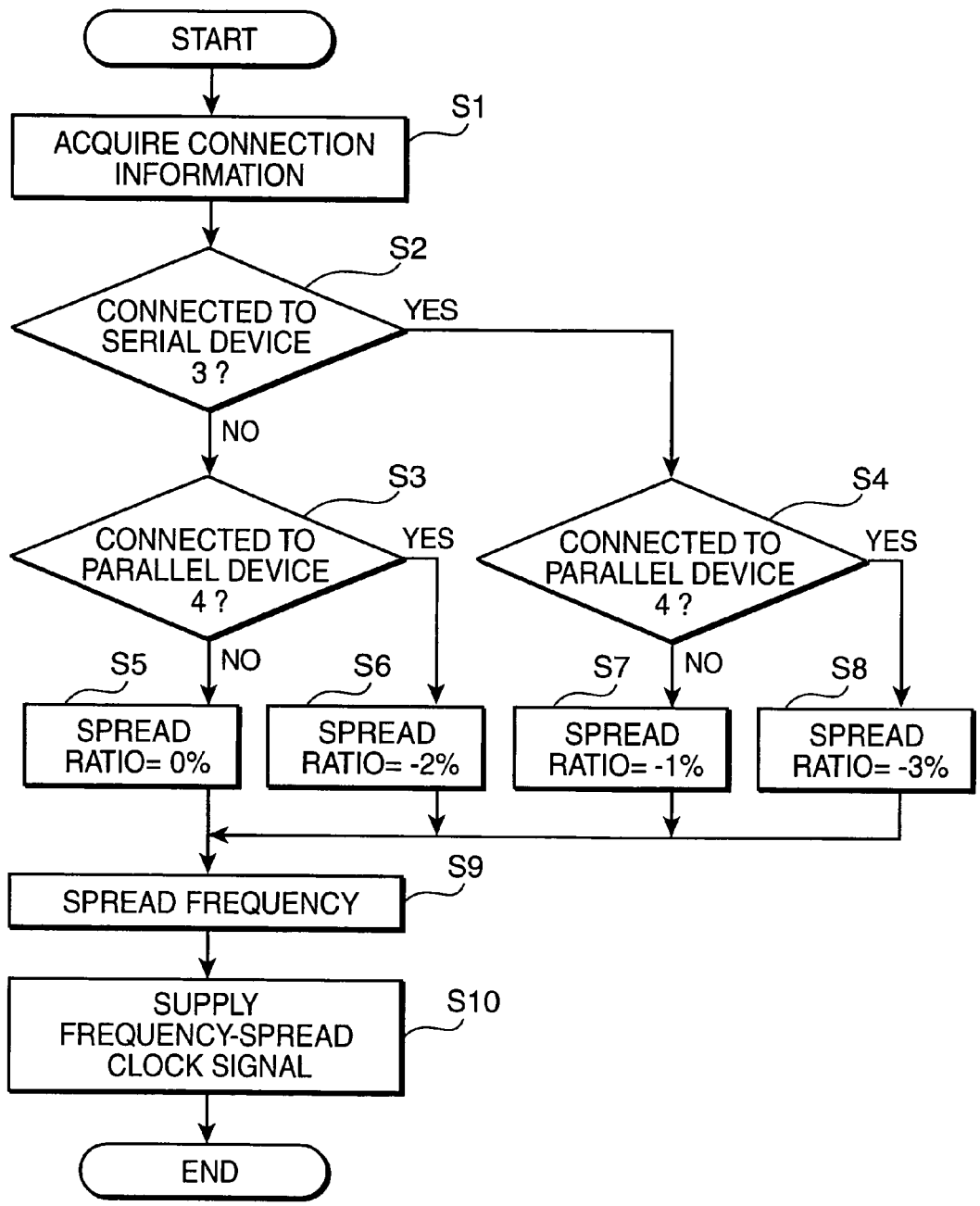
FIG. 4 is a flowchart showing an example of an operation procedure of a clock signal supplying process to be executed by a controlling section in the clock signal controlling device.

In the following, an embodiment of the invention is described referring to the accompanying drawings. It should be noted that the following embodiment is merely an example embodying the invention, and does not limit the technical scope of the invention.

FIG. 1 is a schematic illustration of an information processor 2 equipped with a clock signal controlling device 1 embodying the invention. The information processor 2 equipped with the clock signal controlling device 1 in this embodiment is described referring to FIG. 1.

The information processor 2, as an example of an electronic device, comprises: a communication interface 20, as an example of a communication section, which includes a serial communication interface 21 for inputting/outputting data with use of a single signal line, and a parallel communication interface 22 for inputting/outputting data with use of plural signal lines e.g. eight or sixteen signal lines; a main controller 23, which is comprised of a computing section such as a CPU or an ASIC, and its peripheral device such as an ROM or an RAM, and which controls an overall operation of the information processor 2 while monitoring a connected state of the communication interface 20; and the clock signal controlling device 1, which supplies, to the main controller 23, an operation clock signal, namely, a reference clock signal or a frequency-spread clock signal, which will be described later.

The clock signal controlling device 1 is provided in the information processor 2, as shown in FIG. 1, in such a manner that the clock signal controlling device 1 is connected to the main controller 23 via a bus, a control line, or the like. In other words, the clock signal controlling device 1 and the main controller 23 are directly connected to each other in the information processor 2.

The information processor 2 is constructed in such a manner that a serial communication device 3 as an example of the electronic device is connected to the serial communication interface 21 of the communication interface 20 according to needs. In other words, by connecting the serial communication device 3 to the information processor 2, the clock signal controlling device 1 and the serial communication device 3 are indirectly connected to each other by way of the information processor 2. In the case where a parallel communication device 4 as an example of the electronic device is connected to the parallel communication interface 22 of the communication interface 20 according to needs, the clock signal controlling device 1 and the parallel communication device 4 are indirectly connected to each other by way of the information processor 2.

In this embodiment, the number of the serial communication interface 21 (parallel communication interface 22) is one. Alternatively, the number of the serial communication interface 21 (parallel communication interface 22) may be plural. Further alternatively, merely the serial communication interface 21 may be provided, or merely the parallel communication interface 22 may be provided.

Next, the clock signal controlling device 1 is described in detail. An example of the clock signal controlling device 1 is a spread spectrum clock generator (SSCG) for supplying an operation clock signal to one or more electronic devices. The clock signal controlling device 1 comprises: a clock signal generating section 11, which includes a crystal oscillator having a crystal unit and which is adapted to generate a reference clock signal having a frequency of e.g. 400 MHz; a frequency spreading section 12 for spreading the frequency of the reference clock signal generated by the clock signal generating section 11 based on a predetermined spread ratio; an ROM 13, as an example of a spread ratio storage, which stores information (hereinafter, called as "spread ratio information") relating to the spread ratio, and various control programs; and a controlling section 14, which includes a computing section such as a CPU or an ASIC, and its peripheral device such as an RAM, and which performs a clock signal supplying process (see the flowchart in FIG. 4) by performing a process in accordance with the control program stored in the ROM 13. The clock signal supplying process will be described later. The respective components in the clock signal controlling device 1 are connected to each other by an internal bus 15.

The clock signal controlling device 1 in the embodiment is internally provided with the clock signal generating section 11. Alternatively, it is possible to spread the frequency of a reference clock signal to be supplied from a clock signal generator (not shown) which is externally connected to the clock signal generating device 1 for outputting.

According to the altered arrangement, the frequency of a clock signal generated by the clock signal generator for generating a clock signal of a certain frequency is spread based on a predetermined spread ratio, and the spread ratio is set in accordance with a used state of the electronic device. This arrangement enables to suppress an electromagnetic wave emitted from the electronic device, and to keep the computation processing speed in the electronic device or the operation speed of the electronic device from unduly lowering.

In this embodiment, the clock signal controlling device 1 having the above arrangement is advantageous in reducing an electromagnetic wave emitted from the information processor 2 by supplying, to the main controller 23 in the information processor 2, a clock signal (hereinafter, called as "frequency-spread clock signal") whose frequency has been controllably spread according to needs.

Now, an electromagnetic wave emitted from the information processor 2 is described. Since the main controller 23 in the information processor 2 is operated based on an operation clock signal supplied from the clock signal controlling device 1, an electromagnetic wave is emitted from the information processor 2. The intensity of the electromagnetic wave emitted from the information processor 2 varies depending on a connected state of the communication interface 20 to the serial communication device 3 and/or to the parallel communication device 4. This is because the electromagnetic wave is amplified due to a connection wire or the like for connecting the communication interface 20 to the serial communication device 3 or the parallel communication device 4. Thus, the intensity of the electromagnetic wave emitted from the information processor 2 varies depending on the connected state of the communication interface 20 to the serial communication device 3 and/or to the parallel communication device 4.

The connected state in this embodiment means a state as to whether the communication interface 20 is connected to the serial communication device 3 and/or to the parallel communication device 4, such as the number of the electronic device to be connected to the communication interface 20 in the information processor 2, or the kind of the communication section. Alternatively, the connected state may be an operated state of the serial communication device 3 or the parallel communication device 4. As described above, the allowable upper limit of the intensity of the electromagnetic wave emitted from the information processor 2 is regulated by the CISPR, the VCCI, or a like organization. In this embodiment, description is made on a premise that the allowable upper limit is 37 dB.

Next, an example of a relation between a connected state of the communication interface 20, and the intensity of an electromagnetic wave emitted from the information processor 2 is described referring to the graph of FIG. 2. FIG. 2 is a graph showing an example of the relation between the intensity of the electromagnetic wave emitted from the information processor 2, and the connected state of the communication interface 20 in the information processor 2. FIG. 2 shows actually measured intensities of the electromagnetic wave emitted from the information processor 2 in the case where the main controller 23 in the information processor 2 is operated based on a reference clock signal having a frequency of 400 MHz, which is supplied from the clock signal controlling device 1.

As shown in FIG. 2, in the case that the reference clock signal of a frequency of 400 MHz is supplied to the main controller 23 in the information processor 2, the actually measured intensity of the electromagnetic wave emitted from the information processor 2 is 37 dB in a state (hereinafter, called as "connected state A") that the communication interface 20 is connected neither to the serial communication device 3 nor to the parallel communication device 4, 40 dB in a state (hereinafter, called as "connected state B") that the communication interface 20 is exclusively connected to the serial communication device 3, 43 dB in a state (hereinafter, called as "connected state C") that the communication interface 20 is exclusively connected to the parallel communication device 4, and 46 dB in a state (hereinafter, called as "connected state D") that the communication interface 20 is connected both to the serial communication device 3 and to the parallel communication device 4. In this way, in the case that the connected state of the communication interface 20 in the information processor 2 is the connected state B, C, or D, the intensity of the electromagnetic wave emitted from the information processor 2 exceeds the allowable upper limit, namely, 37 dB.

As mentioned above, in the conventional SSCG, the intensity of the electromagnetic wave is kept as low as the allowable upper limit or less by supplying, to the main controller 23, a frequency-spread clock signal obtained by spreading the frequency of the reference clock signal based on a constant spread ratio. Since the spread ratio is constant, it is required to define the spread ratio that makes it possible to keep the maximal intensity (46 dB) of the electromagnetic wave emitted from the information processor 2 in the connected state D to the allowable upper limit or lower. Accordingly, in the respective connected states A, B, and C where the intensities of the electromagnetic wave emitted from the information processor 2 are 37 dB, 40 dB, and 43 dB, a frequency-spread clock signal whose frequency has been spread with the spread ratio in correspondence to the connected state D is supplied to the main controller 23. Thus, in the conventional SSCG, the computation processing speed of the main controller 23, or the operation speed of the information processor 2 to be controlled by the main controller 23 in the connected states A, B, and C is unduly lowered.

As compared with the conventional arrangement, the clock signal controlling device 1 in the embodiment is so configured that spread ratios in accordance with the respective connected states A, B, C, and D are stored in advance in the ROM 13 as information relating to the spread ratio (hereinafter, called as "spread ratio information") so that a spread ratio suitable for the corresponding one of the connected states is extractable from the ROM 13.

In the following, the spread ratio information stored in the ROM 13 is described in detail. FIG. 3 is an illustration showing an example of a table concerning the spread ratio information stored in the ROM 13 of the clock signal controlling device 1.

As shown in FIG. 3, the spread ratio information table in the embodiment shows correlations between the connected states of the communication interface 20, namely, the connected states A, B, C, and D, the actually measured intensities of the electromagnetic wave in correspondence to the respective connected states, and the spread ratios in correspondence to the respective connected states.

Specifically, the respective spread ratios are set in correspondence to the intensities of the electromagnetic wave emitted from the information processor 2, which have been detected beforehand in accordance with the possible connected states of the communication interface 20, and are known values depending on the respective connected states of the communication interface 20. The electromagnetic wave in the specification and the claims means an electromagnetic wave that is detected based on a parameter capable of measuring a degree of influence to the electronic device e.g. an intensity of an electromagnetic wave, an intensity of an electromagnetic wave noise, a frequency of an electromagnetic wave, and an amplitude of an electromagnetic wave. In this embodiment, a case is described by taking the intensity of the electromagnetic wave as an example.

The respective spread ratios shown in FIG. 3 are so defined that the intensity of the electromagnetic wave emitted from the information processor 2 is kept as low as the allowable upper limit i.e. 37 dB or less in the corresponding respective connected states of the communication interface 20.

As shown in FIG. 3, in the connected state A where the communication interface 20 is connected neither to the serial communication device 3 nor to the parallel communication device 4, the electromagnetic wave intensity 37 dB and the spread ratio 0% are correlated to each other. In the connected state B where the communication interface 20 is merely connected to the serial communication device 3, the electromagnetic wave intensity 40 dB and the spread ratio −1% are correlated to each other. In the connected state C where the communication interface 20 is merely connected to the parallel communication device 4, the electromagnetic wave intensity 43 dB and the spread ratio −2% are correlated to each other. In the connected state D where the communication interface 20 is connected both to the serial communication device 3 and to the parallel communication device 4, the electromagnetic wave intensity 46 dB and the spread ratio −3% are correlated to each other.

In this embodiment, the ROM 13 stores therein the correlations between the connected states of the communication interface 20 to the serial communication device 3 and/or to the parallel communication device 4, the electromagnetic wave intensities, and the spread ratios. Alternatively, the connected states of the communication interface 20 to the serial communication device 3 and/or to the parallel communication device 4, and the spread ratios may be correlated to each other.

In the clock signal controlling device 1 having the above arrangement, when a clock signal supplying process, which will be described later, is executed by the controlling section 14, the spread ratio in correspondence to the connected state A, B, C, or D is suitably selected from the spread ratio information table (see FIG. 3) stored in the ROM 13, and a frequency-spread clock signal whose frequency has been spread based on the selected spread ratio is supplied to the main controller 23 in the information processor 2.

A spread ratio is so set that the electromagnetic wave intensity, which is detected in advance depending on a used state of the electronic device, is kept at the predetermined allowable upper limit or less. This arrangement enables to keep the intensity of the electromagnetic wave emitted from the information processor 2 as low as the allowable upper limit or less, and to keep the computation processing speed of the main controller 23, the operation speed of the information processor 2 to be controlled by the main controller 23, or the like from unduly lowering.

Next, described is an example of an operation procedure of the clock signal supplying process to be executed by the controlling section 14 in the clock signal controlling device 1 in accordance with the control program stored in the ROM 13. FIG. 4 is a flowchart showing an example of the procedure of the clock signal supplying process to be executed by the controlling section 14 in the clock signal controlling device 1. Hereinafter, S1, S2, . . . denote the respective numbers of steps in the operation procedure to be executed by the controlling section 14.

When a power is supplied to the information processor 2, as shown in FIG. 4, the clock signal controlling device 1 is operated to spread the frequency of the reference clock signal based on the set spread ratio by executing a clock frequency spread ratio setting process, namely, operations from Steps S1 through S8 of setting a spread ratio in accordance with a connected state of the communication interface 20, and then, the controlling section 14 executes a series of the clock signal supplying process of supplying a frequency-spread clock signal to the main controller 23. The part in the controlling section 14 of executing the clock frequency spread ratio setting process corresponds to a spread ratio setting section.

When the clock frequency spread ratio setting process starts, the main controller 23 for monitoring the connected state of the communication interface 20, sends, to the controlling section 14, information (hereinafter, called as "connection information") as to the connected state of the communication interface 20 e.g. information as to whether the serial communication interface 21 is connected to the serial communication device 3, or the parallel communication interface 22 is connected to the parallel communication device 4 (Step S1). The controlling section 14 thus acquires the connection information.

Subsequently, a judgment is made as to whether the communication interface 20 is connected to the serial communication device 3 based on the connection information (Step S2). Specifically, the controlling section 14 judges whether the serial communication interface 21 is connected to the serial communication device 3. If the serial communication interface 21 is judged not to be connected to the serial communication device 3 (NO in Step S2), the routine proceeds to the operation in Step S3. If, on the other hand, the serial communication interface 21 is judged to be connected to the serial communication device 3 (YES in Step S2), the routine goes to the operation in Step S4.

Next, in Steps S3 and S4, a judgment is made as to whether the communication interface 20 is connected to the parallel communication device 4 based on the connection information, and an adequate processing is performed in accordance with a judgment result.

Specifically, if the serial communication interface 21 is judged not be connected to the serial communication device 3 (NO in Step S2), the controlling section 14 judges whether the parallel communication interface 22 is connected to the parallel communication device 4 (Step S3). If the parallel communication interface 22 is judged not to be connected to the parallel communication device 4 (NO in Step S3), the controlling section 14 judges that the communication interface 20 is in the connected state A where the communication interface 20 is connected neither to the serial communication device 3 nor to the parallel communication device 4.

Then, the controlling section 14 selects and sets the spread ratio 0% corresponding to the connected state A from the spread ratio information table (see FIG. 3) stored in the ROM 13 (Step S5). Thereafter, the routine goes to Step S9.

On the other hand, if the parallel communication interface 22 is judged to be connected to the parallel communication device 4 (YES in Step S3), the controlling section 14 judges that the communication interface 20 is in the connected state C where the communication interface 20 is connected merely to the parallel communication device 4.

Then, the controlling section 14 selects and sets the spread ratio −2% corresponding to the connected state C from the spread ratio information table (see FIG. 3) stored in the ROM 13 (Step S6). Thereafter, the routine goes to Step S9.

If the communication interface 20 is judged to be connected to the serial communication device 3 (YES in Step S2), the controlling section 14 judges whether the parallel communication interface 22 is connected to the parallel communication device 4 (Step S4). If the parallel communication interface 22 is judged not be connected to the parallel communication device 4 (NO in Step S4), the controlling section 14 judges that the communication interface 20 is in the connected state B where the communication interface 20 is connected merely to the serial communication device 3.

Then, the controlling section 14 selects and sets the spread ratio −1% corresponding to the connected state B from the spread ratio information table (see FIG. 3) stored in the ROM 13 (Step S7). Thereafter, the routine goes to Step S9.

If the communication interface 20 is judged to be connected to the parallel communication device 4 (YES in Step S4), the controlling section 14 judges that the communication interface 20 is in the connected state D where the serial communication interface 21 is connected to the serial communication device 3, and the parallel communication interface 22 is connected to the parallel communication device 4, respectively.

Then, the controlling section 14 selects and sets the spread ratio −3% corresponding to the connected state D from the spread ratio information table (see FIG. 3) stored in the ROM 13 (Step S8). Thereafter, the routine goes to Step S9.

Next, the controlling section 14 sends, to the frequency spreading section 12, the spread ratio obtained by implementing the clock frequency spread ratio setting process, namely, the operations from Steps S1 through S8 (Step S9). The frequency spreading section 12 spreads the frequency of the reference clock signal generated by the clock signal generating section 11 based on the spread ratio sent from the controlling section 14.

Since the technique of spreading the frequency of the reference clock signal by the frequency spreading section 12 is well-known, a detailed description thereof is omitted herein. The frequency 400 MHz of the reference clock signal after spreading with the spread ratio of −1% ranges from 396 to 400 MHz, namely, 398 MHz in average, ranges from 392 to 400 MHz, namely, 396 MHz in average after spreading with the spread ratio of −2%, and ranges from 388 to 400 MHz, namely, 394 MHz in average after spreading with the spread ratio of −3%, respectively. In other words, the frequency spreading section 12 enables to increasingly spread the frequency of the clock signal by increasing the spread ratio. The spread ratio of 0% indicates that the frequency is not spread.

If the communication interface 20 is judged to be in the connected state A, the clock signal is supplied to the main controller 23 without spreading of the frequency thereof. Specifically, in the case where the communication interface 20 is connected neither to the serial communication device 3 nor to the parallel communication device 4, the emission amount of the electromagnetic wave is kept within an allowable upper limit In this case, the generated clock signal is directly supplied to the main controller 23 without the need of spreading the frequency of the clock signal.

Subsequently, the frequency spreading section 12 supplies the frequency-spread clock signal to the main controller 23 in the information processor 2 (Step S10). Thus, the series of the clock signal supplying process to be executed by the controlling section 14 in the clock signal controlling device 1 is terminated. Thereafter, the frequency-spread clock signal whose frequency has been spread based on the set spread ratio is continued to be supplied from the frequency spreading section 12 in the clock signal controlling device 1 to the main controller 23 in the information processor 2.

In this way, the frequency-spread clock signal whose frequency has been spread based on the spread ratio in accordance with the actually connected state of the communication interface 20 is supplied to the main controller 23 in using the information processor 2. In other words, a frequency-spread clock signal whose frequency has been spread with a possible minimal spread ratio which makes it possible to keep the intensity of the electromagnetic wave emitted from the information processor 2 as low as the allowable upper limit or less is supplied to the main controller 23. This arrangement enables to keep the computation processing speed of the main controller 23 or the operation speed of the information processor 2 to be controlled by the controlled 23 from unduly lowering.

Also, in the above arrangement, since the spread ratio is set in accordance with a used state of the electronic device such as the serial communication device 3 and the parallel communication device 4, the electromagnetic wave emitted from the electronic device is suppressed, and the computation processing speed in the electronic device or the operation speed of the electronic device is kept from unduly lowering.

Further, in the above arrangement, the spread ratios depending on the respective used states of the electronic device such as the serial communication device 3 and the parallel communication device 4 are stored in advance in the spread ratio storage, and the spread ratio in accordance with a used state of the electronic device is selected and set from among the spread ratios stored in the spread ratio storage. This arrangement eliminates a computation process for obtaining the spread ratio, and enables to easily set the spread ratio.

Furthermore, a judgment is made as to whether the communication interface 20 is in the connected state A corresponding to a first connected state where the communication interface 20 is connected neither to the serial communication device 3 nor to the parallel communication device 4, the connected state B corresponding to a second connected state where the communication interface 20 is merely connected to the serial communication device 3, the connected state C corresponding to a third connected state where the communication interface 20 is merely connected to the parallel communication device 4, or the connected state D corresponding to a fourth connected state where the communication interface 20 is connected both to the serial communication device 3 and to the parallel communication device 4, and the spread ratio is set in accordance with the detected connected state. Since the emission amount of the electromagnetic wave differs between serial communication and parallel communication, this arrangement enables to set an adequate spread ratio in accordance with a connected state of the communication interface 20 to the serial communication device 3 and/or to the parallel communication device 4.

Moreover, the spread ratio in the connected state B is set larger than the spread ratio in the connected state A, the spread ratio in the connected state C is set larger than the spread ratio in the connected state B, and the spread ratio in the connected state D is set larger than the spread ratio in the connected state C. In other words, since the emission amount of the electromagnetic wave is increased in the order of the connected states A, B, C, and D, a proper spread ratio is set each time the connected state is detected by changing the spread ratio in accordance with the detected connected state. It is possible to increasingly spread the frequency of the clock signal by increasing the spread ratio.

More specifically, the intensities of the electromagnetic wave are kept as low as the allowable upper limit i.e. 37 dB or less in all the cases of the connected states A, B, C, and D, and the frequency of the clock signal is spread with a proper spread ratio in the respective connected states A, B, C, and D without an excessive spread. The aforementioned connected states of the communication interface 20 are merely examples of the used state of the information processor 2. The used state of the information processor 2 embraces a connected state of the other electronic device to which the clock signal controlling device 1 is directly or indirectly connected, the number of the electronic device to be connected to the information processor 2, and the kind of the communication interface 20.

In this embodiment, prior to start of supplying an operation clock signal to the main controller 23 in the information processor 2, the spread ratios in accordance with the respective connected states of the communication interface 20 in the information processor 2 are set in advance. This arrangement enables to keep the intensity of the electromagnetic wave emitted from the information processor 2 from unduly increasing over the allowable upper limit beforehand. Alternatively, properly changing the spread ratio in accordance with a connected state of the communication interface 20 or a like parameter by constantly and cyclically executing the clock frequency spread ratio setting process, namely, the operations from Steps S1 through S8 enables to timely supply a frequency-spread clock signal whose frequency has been spread based on the proper spread ratio to the main controller 23 in the information processor 2.

In this embodiment, description is made on the premise that the electromagnetic wave intensity of 37 dB in the connected state A is a minimal intensity of the electromagnetic wave to be emitted from the information processor 2. If the electromagnetic wave intensity is lower than the allowable upper limit of 37 dB depending on a connected state of the communication interface 20, a used state of the information processor 2 or a like condition, there is no need of keeping the electromagnetic wave intensity as low as the allowable upper limit. It is needless to say that the information processor 2 may be so configured as to supply a reference clock signal to the main controller 23 without spreading the frequency thereof.

In this embodiment, the spread ratio is set depending on a connected state of the communication interface 20. Alternatively, the spread ratio may be set depending on a connected state of the communication interface 20, and an operated state of an electronic device to be connected to the communication interface 20.

FIG. 5 is a flowchart for describing an altered operation procedure of the clock signal supplying process to be executed by the controlling section 14 in the clock signal controlling device 1. Steps in FIG. 5 equivalent to those in FIG. 4 are denoted at the same step numbers as those in FIG. 4, and description thereof is omitted herein.

First, information (hereinafter, called as "connection information") as to the connected state of the communication interface 20, namely, information as to whether the serial communication interface 21 and the parallel communication interface 22 are connected to the serial communication device 3 and to the parallel communication device 4, respectively, and information (hereinafter, called as "operation information") as to the operated state of the serial communication device 3 connected to the serial communication interface 21, and the operated state of the parallel communication device 4 connected to the parallel communication interface 22, namely, information as to whether the serial communication device 3 and the parallel communication device 4 are operated, are transmitted from the main controller 23 for monitoring the connected state and the operated state of the communication interface 20 to the controlling section 14 (Step S1). The controlling section 14 thus acquires the connection information and the operation information.

Then, if the communication interface 20 is judged to be connected to the parallel communication device 4 (YES in Step S3), the controlling section 14 judges whether the parallel communication device 4 is operated based on the acquired operation information (Step S11). If the parallel communication device 4 is judged not to be operated (NO in Step S11), the routine goes to the operation in Step S5 where the spread ratio is set to 0%. On the other hand, if the parallel communication device 4 is judged to be operated (YES in Step S11), the routine goes to the operation in Step S6 where the spread ratio is set to −2%.

Specifically, if the communication interface 20 is exclusively connected to the parallel communication device 4, and if the parallel communication device 4 is operated, which corresponds to a third operated state of the electronic device, the spread ratio is set to −2%. If the communication interface 20 is exclusively connected to the parallel communication device 4, and if the parallel communication device 4 is not operated, which corresponds to a first operated state of the electronic device, the spread ratio is set to 0%. In this way, even if the parallel communication device 4 is connected to the communication interface 20, as long as the parallel communication device 4 is not operated, the spread ratio is kept unchanged, and the spread ratio is changed only if the parallel communication device 4 is operated.

Further, if the communication interface 20 is judged to be connected to the serial communication device 3 (YES in Step S2), and if the communication interface 20 is judged not be connected to the parallel communication device 4 (NO in Step S4), the controlling section 14 judges whether the serial communication device 3 is operated based on the acquired operation information (Step S12). If the serial communication device 3 is judged not to be operated (NO in Step S12), the routine goes to the operation in Step S5 where the spread ratio is set to 0%. On the other hand, if the serial communication device 3 is judged to be operated (YES in Step S12), the routine goes to the operation in Step S7 where the spread ratio is set to −1%.

Specifically, if the communication interface 20 is exclusively connected to the serial communication device 3, and if the serial communication device 3 is operated, which corresponds to a second operated state of the electronic device, the spread ratio is set to −1%. On the other hand, if the communication interface 20 is exclusively connected to the serial communication device 3, and if the serial communication device 3 is not operated, which corresponds to the first operated state of the electronic device, the spread ratio is set to 0. In this way, even if the serial communication device 3 is connected to the communication interface 20, as long as the serial communication device 3 is not operated, the spread ratio is kept unchanged, and the spread ratio is changed only if the serial communication device 3 is operated.

Further, if the communication interface 20 is judged to be connected to the serial communication device 3 (YES in Step S2), and if the communication interface 20 is judged to be connected to the parallel communication device 4 (YES in Step S4), the controlling section 14 judges whether the serial communication device 3 is operated based on the acquired operation information (Step S13). If the serial communication device 3 is judged to be operated (YES in Step S13), the routine goes to the operation in Step S14.

If the communication interface 20 is judged to be connected to the serial communication device 3 (YES in Step S2), and if the communication interface 20 is judged to be connected to the parallel communication device 4 (YES in Step S4), and if the serial communication device 3 is judged to be operated (YES in Step S13), the controlling section 14 judges whether the parallel communication device 4 is operated based on the acquired operation information (Step S14). If the parallel communication device 4 is judged not to be operated (NO in Step S14), the routine goes to the operation in Step S7 where and the spread ratio is set to −1%. On the other hand, if the parallel communication device 4 is judged to be operated (YES in Step S14), the routine goes to the operation in Step S8 where the spread ratio is set to −3%.

Specifically, if the communication interface 20 is connected both to the serial communication device 3 and to the parallel communication device 4, and if the serial communication device 3 is exclusively operated, which corresponds to the second operated state of the electronic device, the spread ratio is set to −1%. If the communication interface 20 is connected both to the serial communication device 3 and to the parallel communication device 4, and if both the serial communication device 3 and the parallel communication device 4 are operated, which corresponds to a fourth operated state of the electronic device, the spread ratio is set to −3%.

Further, if the communication interface 20 is judged to be connected to the serial communication device 3 (YES in Step S2), and if the communication interface 20 is judged to be connected to the parallel communication device 4 (YES in Step S4), and if the serial communication device 3 is judged not to be operated (NO in Step S13), the controlling section 14 judges whether the parallel communication device 4 is operated based on the acquired operation information (Step S15). If the parallel communication device 4 is judged not to be operated (NO in Step S15), the routine goes to the operation in Step S5 where the spread ratio is set to 0%. On the other hand, if the parallel communication device 4 is judged to be operated (YES in Step S15), the routine goes to the operation in Step S6 where the spread ratio is set to −2%.

Specifically, if the communication interface 20 is connected both to the serial communication device 3 and to the parallel communication device 4, and if the parallel communication device 4 is exclusively operated, which corresponds to the third operated state of the electronic device, the spread ratio is set to −2%. If the communication interface 20 is connected both to the serial communication device 3 and to the parallel communication device 4, and if neither the serial communication device 3 nor the parallel communication device 4 is operated, which corresponds to the first operated state of the electronic device, the spread ratio is set to 0%.

In this way, even if both the serial communication device 3 and the parallel communication device 4 are connected to the communication interface 20, as long as at least one of the serial communication device 3 and the parallel communication device 4 is not operated, the spread ratio is kept unchanged, and the spread ratio is changed only if at least one of the serial communication device 3 and the parallel communication device 4 is operated.

In the embodiment, description is made by taking the information processor 2 as an example of the electronic device. The invention is applicable to other examples of the electronic device such as an image processing apparatus, an image forming apparatus, an information processing apparatus, a telecommunication device, and an electronic office appliance.

If, for instance, the clock signal controlling device 1 is incorporated in an image forming apparatus, the spread ratio is set in accordance with a used state of the image forming apparatus. Specifically, the spread ratio may be set in accordance with a connected state of various component units including optional units such as a scanner unit, a sheet feeder unit, an imaging unit, and a post-processing unit, which are attached to an image forming apparatus main body.

FIG. 6 is an illustration showing an example of the image forming apparatus to which the inventive clock signal controlling device is applied. The image forming apparatus 2' in FIG. 6 comprises the clock signal controlling device 1, the main controller 23, a scanner unit 5, a sheet feeder unit 6, an imaging unit 7, and a post-processing unit 8. The image forming apparatus 2' is a copier, a fax, a printer, or a complex machine incorporated with functions of a copier, a fax, and a printer.

The main controller 23 is adapted to control the scanner unit 5, the sheet feeder unit 6, the imaging unit 7, and the post-processing unit 8 by using a clock signal which is controlled by the clock signal controlling device 1. The scanner unit 5 reads a document image, and acquires image data of the read document image. The sheet feeder unit 6 feeds a recording sheet as timed with an image forming operation. The imaging unit 7 forms an image on the recording sheet fed by the sheet feeder unit 6. The post-processing unit 8 applies various post-processing such as sorting and stapling to the recording sheet recorded with the image formed by the imaging unit 7.

It is possible to eliminate one or more of the units among the scanner unit 5, the sheet feeder unit 6, the imaging unit 7, and the post-processing unit 8 from the image forming apparatus 2' according to needs, depending on the type of the image forming apparatus 2'. Alternatively, the image forming apparatus 2' may be additionally provided with a component unit other than the scanner unit 5, the sheet feeder unit 6, the imaging unit 7, and the post-processing unit 8 according to needs. Examples of the other component unit are an image processing unit for applying various image processing to image data, and an operation unit for accepting various operations designated by a user.

In the image forming apparatus 2' incorporated with the clock signal controlling device 1, an ROM 13 corresponding to a storage stores therein spread ratios that enable to keep intensities of the electromagnetic wave emitted from the image forming apparatus 2' to an allowable upper limit or lower, wherein the electromagnetic wave intensities have been measured in advance in possible respective connected states of the various component units including the optional units. In operating the image forming apparatus 2', a proper spread ratio is selected and set from among the spread ratios stored in the ROM 13 in accordance with the actually connected states of the respective units.

In the above arrangement, since a frequency-spread clock signal whose frequency has been spread based on the spread ratio set in accordance with the connected states of the respective units is supplied to the main controller 23 in the image forming apparatus 2', the intensity of the electromagnetic wave emitted from the image forming apparatus 2' can be kept as low as the allowable upper limit or less, and the operation speed of the image forming apparatus 2' can be kept from unduly lowering.

Also, since the spread ratio is set in accordance with at least one of the connected states of the scanner unit 5, the sheet feeder unit 6, the imaging unit 7, and the post-processing unit 8, emission of the electromagnetic wave from the image forming apparatus 2' can be suppressed, and the operation speed of the image forming apparatus 2' can be kept from unduly lowering.

The aforementioned embodiment includes the invention having the following arrangements.

A clock signal controlling device according to an aspect of the invention is adapted for controlling a clock signal to be supplied to one or more electronic devices. The clock signal controlling device comprises: a clock signal generating section which generates a clock signal of a predetermined frequency; a frequency spreading section which spreads the frequency of the clock signal generated by the clock signal generating section based on a predetermined spread ratio; and a spread ratio setting section which sets the spread ratio in accordance with a used state of the electronic device.

According to the above arrangement, since the spread ratio is set in accordance with the used state of the electronic device, an electromagnetic wave emitted from the electronic device can be suppressed, and the computation processing speed in the electronic device or the operation speed of the electronic device can be kept from unduly lowering.

Preferably, the spread ratio setting section may set the spread ratio in accordance with the used state of the electronic device before start of supplying the clock signal to the electronic device. This arrangement enables to set the spread ratio in accordance with the used state of the electronic device before start of supplying the clock signal to the electronic device, and to keep the electromagnetic wave emitted from the electronic device from exceeding a predetermined allowable upper limit.

Preferably, the clock signal controlling device may further comprise a spread ratio storage which stores therein spread ratios in accordance with respective used states of the electronic device in advance, wherein the spread ratio setting section selects and sets the spread ratio in accordance with the used state of the electronic device from among the spread ratios stored in the spread ratio storage.

In the above arrangement, the spread ratios in accordance with the respective used states of the electronic device are stored in advance in the spread ratio storage, and the spread ratio is selected and set in accordance with the detected used state of the electronic device from among the spread ratios stored in the spread ratio storage. This arrangement enables to eliminate a computation process for obtaining the spread ratio, and to easily set the spread ratio.

Preferably, the used state of the electronic device may include a connected state of the electronic device which is directly or indirectly connected to the clock signal controlling device. In this arrangement, the spread ratio can be set in accordance with the connected state of the electronic device which is directly or indirectly connected to the clock signal controlling device.

Preferably, the clock signal controlling device may further comprise a communication section which communicates data with the electronic device, wherein the connected state of the electronic device includes the number of the electronic device to be connected to the communication section, and the kind of the communication section. In this arrangement, the spread ratio can be set in accordance with the number of the electronic device which is directly or indirectly connected to the clock signal controlling device, or the kind of the communication section.

Preferably, the used state of the electronic device may include a connected state of the electronic device which is directly or indirectly connected to the clock signal controlling device, and an operated state of the electronic device. In this arrangement, the spread ratio can be set in accordance with the connected state of the electronic device which is directly or indirectly connected to the clock signal controlling device, and the operated state of the electronic device.

Preferably, the spread ratio setting section may set a spread ratio larger than the spread ratio set in the case where the electronic device is not operated, in the case where the electronic device is operated.

In the above arrangement, in the case where the electronic device is operated, the spread ratio is set at a value larger than the spread ratio set in the case where the electronic device is not operated. As compared with the case that the electronic device is not operated, a large amount of electromagnetic wave is emitted from the electronic device in the case where the electronic device is operated. Accordingly, setting the spread ratio in the case that the electronic device is operated larger than the spread ratio in the case that the electronic device is not operated enables to suppress emission of the electromagnetic wave from the electronic device.

Preferably, the spread ratio setting section may set the spread ratio in correspondence to the electromagnetic wave emitted from the electronic device, the electromagnetic wave being detected in advance depending on the used state of the electronic device.

Specifically, the spread ratios are known values in correspondence to the electromagnetic wave in the respective used states of the electronic device. The electromagnetic wave means an electromagnetic wave that is detected based on a parameter capable of measuring a degree of influence to the electronic device e.g. an intensity of an electromagnetic wave, an intensity of an electromagnetic wave noise, a frequency of an electromagnetic wave, and an amplitude of an electromagnetic wave. In this arrangement, since the spread ratio in correspondence to the electromagnetic wave emitted from the electronic device, which has been detected in accordance with the used state of the electronic device, is set, a clock signal of a proper frequency can be supplied without unduly lowering the frequency of the clock signal.

Preferably, the spread ratio setting section may set the spread ratio for keeping an intensity of the electromagnetic wave emitted from the electronic device to a predetermined allowable upper limit or lower, the intensity of the electromagnetic wave being detected in advance depending on the used state of the electronic device.

In the above arrangement, the spread ratio is set so that the intensity of the electromagnetic wave emitted from the electronic device, which has been detected in accordance with the used state of the electronic device, is kept at the predetermined allowable upper limit or lower. This arrangement enables to keep the electromagnetic wave emitted from the electronic device from exceeding the allowable upper limit, and to supply a clock signal of a proper frequency without unduly lowering the frequency of the clock signal.

Preferably, the communication section may include a serial communication interface, and a parallel communication interface, the electronic device may include a serial communication device for communicating with the clock signal controlling device via the serial communication interface, and a parallel communication device for communicating with the clock signal controlling device via the parallel communication interface, and the spread ratio setting section may judge whether the communication section is in a first connected state where the communication section is neither connected to the serial communication device nor to the parallel communication device, or in a second connected state where the communication section is connected exclusively to the serial communication device, or in a third connected state where the communication section is connected exclusively to the parallel communication device, or in a fourth connected state where the communication section is connected both to the serial communication device and to the parallel communication device, and may set the spread ratio in accordance with the detected connected state.

In the above arrangement, the communication section includes the serial communication interface, and the parallel communication interface. The electronic device includes the serial communication device for communicating with the clock signal controlling device via the serial communication interface, and the parallel communication device for communicating with the clock signal controlling device via the parallel communication interface. A judgment is made as to whether the communication section is in the first connected state where the communication section is connected neither to the serial communication device nor to the parallel communication device, or in the second connected state where the communication section is connected exclusively to the serial communication device, or in the third connected state where the communication section is connected exclusively to the parallel communication device, or in the fourth connected state where the communication section is connected both to the serial communication device and to the parallel communication device, and the spread ratio is set in accordance with the detected connected state.

Since the emission amount of the electromagnetic wave differs between serial communication and parallel communication, the above arrangement enables to set a proper spread ratio in accordance with the connected state of the communication section to the serial communication device and/or the parallel communication device.

Preferably, the spread ratio setting section may set the spread ratio corresponding to the second connected state larger than the spread ratio corresponding to the first connected state, set the spread ratio corresponding to the third connected state larger than the spread ratio corresponding to the second connected state, and set the spread ratio corresponding to the fourth connected state larger than the spread ratio corresponding to the third connected state.

In the above arrangement, the spread ratio corresponding to the second connected state is set larger than the spread ratio corresponding to the first connected state, the spread ratio corresponding to the third connected state is set larger than the spread ratio corresponding to the second connected state, and the spread ratio corresponding to the fourth connected state is set larger than the spread ratio corresponding to the third connected state. In other words, since the emission amount of the electromagnetic wave is increased in the order of the first connected state, the second connected state, the third connected state, and the fourth connected state, a proper spread ratio can be set each time the connected state is detected by changing the spread ratio in accordance with the detected connected state of the communication section. It is possible to increasingly spread the frequency of the clock signal by increasing the spread ratio.

Preferably, the spread ratio setting section may supply the clock signal generated by the clock signal generating section to the electronic device without spreading the frequency of the clock signal if the spread ratio setting section judges that the communication section is in the first connected state.

In the above arrangement, in the case where the communication section is judged to be in the first connected state, the clock signal is supplied to the electronic device without spreading the frequency of the clock signal. In other words, in the case where the communication section is connected neither to the serial communication device nor to the parallel communication device, the emission amount of the electromagnetic wave is kept within an allowable upper limit. This arrangement enables to directly supply the generated clock signal to the electronic device without the need of spreading the frequency of the clock signal.

Preferably, the spread ratio setting section may judge whether the electronic device is in a first operated state where neither the serial communication device nor the parallel communication device is operated, in a second operated state where the serial communication device is exclusively operated, in a third operated state where the parallel communication device is exclusively operated, or in a fourth operated state where both the serial communication device and the parallel communication device are operated, and may set the spread ratio in accordance with the detected connected state of the communication section and the detected operated state of the electronic device.

In the above arrangement, a judgment is made as to whether the communication section is in the first operated state where neither the serial communication device nor the parallel communication device is operated, in the second operated state where the serial communication device is exclusively operated, in the third operated state where the parallel communication device is exclusively operated, or in the fourth operated state where both the serial communication device and the parallel communication device are operated, and the spread ratio is set in accordance with the detected connected state of the communication section and the detected operated state of the electronic device.

The above arrangement enables to set a proper spread ratio in accordance with the connected state of the communication section to the serial communication device and/or to the parallel communication device, and the operated state of the serial communication device and of the parallel communication device connected to the communication section, and to finely set the frequency of the clock signal, which makes it possible to keep the computation processing speed in the electronic device and the operation speed of the electronic device from unduly lowering.

Preferably, the electronic device may include at least one of a scanner unit, a sheet feeder unit, an imaging unit, and a post-processing unit of an image forming apparatus, the image forming apparatus may include the clock signal controlling device, and the spread ratio setting section may set the spread ratio in accordance with at least one of respective connected states of the scanner unit, the sheet feeder unit, the imaging unit, and the post-processing unit.

In the above arrangement, the electronic device includes at least one of the scanner unit, the sheet feeder unit, the imaging unit, and the post-processing unit of the image forming apparatus, the image forming apparatus includes the clock signal controlling device, and the spread ratio is set in accordance with at least one of the respective connected states of the scanner unit, the sheet feeder unit, the imaging unit, and the post-processing unit. This arrangement enable to suppress emission of the electromagnetic wave from the image forming apparatus, and to keep the operation speed of the image forming apparatus from unduly lowering.

Preferably, the used state of the electronic device may include a connected state of the electronic device which is directly or indirectly connected to the clock signal controlling device.

In the above arrangement, the spread ratios in accordance with the respective connected states of the electronic device which is directly or indirectly connected to the clock signal controlling device are stored in advance in the spread ratio storage, and the spread ratio is selected and set in accordance with the detected connected state of the electronic device from among the spread ratios stored in the spread ratio storage. This arrangement enables to easily set the spread ratio without the need of a computation process for obtaining the spread ratio, and to set the spread ratio in accordance with the connected state of the electronic device.

Preferably, the clock signal controlling device may further comprise a communication section which communicates data with the electronic device, wherein the connected state of the electronic device includes the number of the electronic device to be connected to the communication section, and the kind of the communication section. In this arrangement, the spread ratios in accordance with the number of the electronic device to be directly or indirectly connected to the clock signal controlling device, or the kind of the communication section are stored in advance in the spread ratio storage, and the spread ratio is selected and set in accordance with the detected connected state of the electronic device from among the spread ratios stored in the spread ratio storage. This arrangement enables to easily set the spread ratio without the need of a computation process for obtaining the spread ratio, and to set the spread ratio in accordance with the number of the electronic device to be connected to the clock signal controlling device, or the kind of the communication section.

Preferably, the communication section may include a serial communication interface, and a parallel communication interface, the electronic device may include a serial communication device for communicating with the clock signal controlling device via the serial communication interface, and a parallel communication device for communicating with the clock signal controlling device via the parallel communication interface, the spread ratio storage may store therein in advance spread ratios in correspondence to a first connected state where the communication section is connected neither to the serial communication device nor to the parallel communication device, a second connected state where the communication section is connected exclusively to the serial communication device, a third connected state where the communication section is connected exclusively to the parallel communication device, and a fourth connected state where the communication section is connected both to the serial communication device and to the parallel communication device, respectively, and the spread ratio setting section may judge whether the communication section is in the first connected state, in the second connected state, in the third connected state, or in the fourth connected state, and may set the spread ratio in correspondence to the detected connected state from among the spread ratios stored in the spread ratio storage in advance.

In the above arrangement, the communication section includes the serial communication interface, and the parallel communication interface, and the electronic device includes the serial communication device for communicating with the clock signal controlling device via the serial communication interface, and the parallel communication device for communicating with the clock signal controlling device via the parallel communication interface. Also, the spread ratio storage stores therein in advance the spread ratios in correspondence to the first connected state where the communication section is connected neither to the serial communication device nor to the parallel communication device, the second connected state where the communication section is connected exclusively to the serial communication device, the third connected state where the communication section is connected exclusively to the parallel communication device, and the fourth connected state where the communication section is connected both to the serial communication device and to the parallel communication device, respectively. A judgment is made as to whether the communication section is in the first connected state, in the second connected state, in the third connected state, or in the fourth connected state, and the spread ratio is set in accordance with the detected connected state from among the spread ratios stored in the spread ratio storage in advance.

Since the emission amount of the electromagnetic wave differs between serial communication and parallel communication, a proper spread ratio can be set in accordance with the connected state of the communication section to the serial communication device and/or the parallel communication device.

Preferably, the spread ratio corresponding to the second connected state may be set larger than the spread ratio corresponding to the first connected state, the spread ratio corresponding to the third connected state may be set larger than the spread ratio corresponding to the second connected state, and the spread ratio corresponding to the fourth connected state may be set larger than the spread ratio corresponding to the third connected state.

In the above arrangement, the spread ratio corresponding to the first connected state is set larger than the spread ratio corresponding to the second connected state, the spread ratio corresponding to the third connected state is set larger than the spread ratio corresponding to the second connected state, and the spread ratio corresponding to the fourth connected state is set larger than the spread ratio corresponding to the third connected state. In other words, since the emission amount of the electromagnetic wave is increased in the order of the first connected state, the second connected state, the third connected state, and the fourth connected state, a proper spread ratio can be set each time the connected state is detected by storing the spread ratio in accordance with the respective connected states of the communication section. It is possible to increasingly spread the frequency of the clock signal by increasing the spread ratio.

Preferably, the spread ratio storage may store therein the first connected state and the spread ratio of 0% in correlation to each other, the spread ratio setting section may select and set the spread ratio of 0% corresponding to the first connected state from among the spread ratios stored in the spread ratio storage in advance if the spread ratio setting section judges that the communication section is in the first connected state, and the frequency spreading section may supply the clock signal generated by the clock signal generating section to the electronic device without spreading the frequency of the clock signal in the case where the spread ratio setting section sets the spread ratio of 0%.

In the above arrangement, the first connected state and the spread ratio of 0% are correlated to each other. If the communication section is judged to be in the first connected state, the spread ratio of 0% corresponding to the first connected state is selected and set from among the spread ratios stored in the spread ratio storage, and if the spread ratio of 0% is set, the clock signal is supplied to the electronic device without spreading the frequency of the clock signal. In this way, the emission amount of the electromagnetic wave is kept within the allowable upper limit as long as the communication section is judged to be connected neither to the serial communication device nor to the parallel communication device, and the generated clock signal is directly supplied to the electronic device without the need of spreading the frequency of the clock signal.

A clock signal controlling device according to another aspect of the invention is adapted for controlling a clock signal to be supplied to one or more electronic devices. The clock signal controlling device comprises: a frequency spreading section which spreads a frequency of the clock signal generated by a clock signal generator for generating a clock signal of a predetermined frequency based on a predetermined spread ratio; and a spread ratio setting section which sets the spread ratio in accordance with a used state of the electronic device.

In the above arrangement, the frequency of the clock signal generated by the clock signal generator for generating a clock signal of a predetermined frequency is spread based on the predetermined spread ratio, and the spread ratio is set in accordance with the used state of the electronic device. This arrangement enables to suppress emission of the electromagnetic wave from the electronic device, and to keep the computation processing speed in the electronic device and the operation speed of the electronic device from unduly lowering.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A clock signal controlling device for controlling a clock signal to be supplied to at least one electronic device, the clock signal controlling device comprising:
   a clock signal generating section which generates the clock signal of a predetermined frequency;
   a frequency spreading section which spreads the frequency of the clock signal generated by the clock signal generating section based on a predetermined spread ratio; and
   a spread ratio setting section which sets the spread ratio in accordance with a used state of the at least one electronic device, wherein
   the used state of the at least one electronic device includes a connected state of the at least one electronic device which is directly or indirectly connected to the clock signal controlling device, and an operated state of the at least one electronic device, and
   the spread ratio selling section sets a spread ratio larger than the spread ratio set in the case where the at least one electronic device is not operated, in the case where the at least one electronic device is operated.

2. The clock signal controlling device according to claim 1, further comprising a spread ratio storage which stores therein spread ratios in accordance with respective used states of the at least one electronic device in advance, wherein
   the spread ratio selling section selects and sets the spread ratio in accordance with the used state of the at least one electronic device from among the spread ratios stored in the spread ratio storage.

3. The clock signal controlling device according to claim 1, further comprising a communication section which communicates data with the at least one electronic device, wherein
   the connected state of the at least one electronic device includes the number of the at least one electronic device to be connected to the communication section, and the kind of the communication section.

4. The clock signal controlling device according to claim 1, wherein
   the spread ratio setting section sets the spread ratio in accordance with the used state of the at least one electronic device before start of supplying the clock signal to the at least one electronic device.

5. A clock signal controlling device for controlling a clock signal to be supplied to at least one electronic device, the clock signal controlling device comprising:
   a clock signal generating section which generates the clock signal of a predetermined frequency;
   a frequency spreading section which spreads the frequency of the clock signal generated by the clock signal generating section based on a predetermined spread ratio; and
   a spread ratio selling section which sets the spread ratio in accordance with a used state of the at least one electronic device, wherein the spread ratio selling section sets the spread ratio in correspondence to an electromagnetic wave emitted from the at least one electronic device, the electromagnetic wave being detected in advance depending on the used state of the at least one electronic device.

6. The clock signal controlling device according to claim 5, wherein the spread ratio selling section sets the spread ratio for keeping an intensity of the electromagnetic wave emitted from the at least one electronic device to a predetermined allowable upper limit or lower, the intensity of the electromagnetic wave being detected in advance depending on the used state of the at least one electronic device.

7. A clock signal controlling device for controlling a clock signal to be supplied to at least one electronic device, the clock signal controlling device comprising:

a clock signal generating section which generates the clock signal of a predetermined frequency;

a frequency spreading section which spreads the frequency of the clock signal generated by the clock signal generating section based on a predetermined spread ratio;

a spread ratio selling section which sets the spread ratio in accordance with a used state of the at least one electronic device; and a communication section which communicates data with the at least one electronic device, wherein the used state of the at least one electronic device includes a connected state of the at least one electronic device which is directly or indirectly connected to the clock signal controlling device, the connected state of the at least one electronic device includes the number of the at least one electronic device to be connected to the communication section, and the kind of the communication section, the communication section includes a serial communication interface, and a parallel communication interface, the at least one electronic device includes a serial communication device for communicating with the clock signal controlling device via the serial communication interface, and a parallel communication device for communicating with the clock signal controlling device via the parallel communication interface, and the spread ratio setting section judges whether the communication section is in a first connected state where the communication section is neither connected to the serial communication device nor to the parallel communication device, or in a second connected state where the communication section is connected exclusively to the serial communication device, or in a third connected state where the communication section is connected exclusively to the parallel communication device, or in a fourth connected state where the communication section is connected both to the serial communication device and to the parallel communication device, and sets the spread ratio in accordance with a detected connected state.

8. The clock signal controlling device according to claim 7, wherein the spread ratio setting section sets the spread ratio corresponding to the second connected state larger than the spread ratio corresponding to the first connected state, sets the spread ratio corresponding to the third connected state larger than the spread ratio corresponding to the second connected state, and sets the spread ratio corresponding to the fourth connected state larger than the spread ratio corresponding to the third connected state.

9. The clock signal controlling device according to claim 7, wherein the spread ratio setting section supplies the clock signal generated by the clock signal generating section to the at least one electronic device without spreading the frequency of the clock signal if the spread ratio setting section judges that the communication section is in the first connected state.

10. The clock signal controlling device according to claim 7, wherein the spread ratio setting section judges whether the communication section is in a first operated state where neither the serial communication device nor the parallel communication device is operated, in a second operated state where the serial communication device is exclusively operated, in a third operated state where the parallel communication device is exclusively operated, or in a fourth operated state where both the serial communication device and the parallel communication device are operated, and sets the spread ratio in accordance with the detected connected state of the communication section and a detected operated state of the at least one electronic device.

11. A clock signal controlling device for controlling a clock signal to be supplied to at least one electronic device, the clock signal controlling device comprising:

a clock signal generating section which generates the clock signal of a predetermined frequency;

a frequency spreading section which spreads the frequency of the clock signal generated by the clock signal generating section based on a predetermined spread ratio; and a spread ratio setting section which sets the spread ratio in accordance with a used state of the at least one electronic device, wherein the used state of the at least one electronic device includes a connected state of the at least one electronic device which is directly or indirectly connected to the clock signal controlling device, the at least one electronic device includes at least one of a scanner unit, a sheet feeder unit, an imaging unit, and a post-processing unit of an image forming apparatus, the image forming apparatus includes the clock signal controlling device, and the spread ratio setting section sets the spread ratio in accordance with at least one of respective connected states of the scanner unit, the sheet feeder unit, the imaging unit, and the post-processing unit.

12. A clock signal controlling device for controlling a clock signal to be supplied to at least one electronic device, the clock signal controlling device comprising:

a clock signal generating section which generates the clock signal of a predetermined frequency;

a frequency spreading section which spreads the frequency of the clock signal generated by the clock signal generating section based on a predetermined spread ratio;

a spread ratio setting section which sets the spread ratio in accordance with a used state of the at least one electronic device, wherein a spread ratio storage which stores therein spread ratios in accordance with respective used states of the at least one electronic device in advance; and a communication section which communicates data with the at least one electronic device, wherein the used state of the at least one electronic device includes a connected state of the at least one electronic device which is directly or indirectly connected to the clock signal controlling device, the connected state of the at least one electronic device includes the number of the at least one electronic device to be connected to the communication section, and the kind of the communication section, the communication section includes a serial communication interface, and a parallel communication interface, the at least one electronic device includes a serial communication device for communicating with the clock signal controlling device via the serial communication interface, and a parallel communication device for communicating with the clock signal controlling device via the parallel communication interface, the spread ratio storage stores therein in advance the spread ratios in correspondence to a first connected state where the communication section is neither connected to the serial communication device nor to the parallel communication device, a second connected state where the communication section is connected exclusively to the serial communication device, a third connected state where the communication section is connected exclusively to the parallel communication device, and a fourth connected state where the communication section is connected both to the serial communication device and to the parallel communication device, respectively, and the spread ratio selling section judges whether the communication section is in the first connected state, in the second connected state, in the third connected state, or in the fourth connected state, and sets the spread ratio in correspondence to a detected connected state from among the spread ratios stored in the spread ratio storage in advance.

13. The clock signal controlling device according to claim 12, wherein the spread ratio corresponding to the second connected state is set larger than the spread ratio corresponding to the first connected state, the spread ratio corresponding to the third connected state is set larger than the spread ratio corresponding to the second connected state, and the spread ratio corresponding to the fourth connected state is set larger than the spread ratio corresponding to the third connected state.

14. The clock signal controlling device according to claim 12, wherein the spread ratio storage stores therein the first connected state and the spread ratio of 0% in correlation to each other, the spread ratio selling section selects and sets the spread ratio of 0% corresponding to the first connected state from among the spread ratios stored in the spread ratio storage in advance if the spread ratio selling section judges that the communication section is in the first connected state, and the frequency spreading section supplies the clock signal generated by the clock signal generating section to the at least one electronic device without spreading the frequency of the clock signal in the case where the spread ratio selling section sets the spread ratio of 0%.

* * * * *